United States Patent [19]

Cohen

[11] Patent Number: 4,621,898

[45] Date of Patent: Nov. 11, 1986

[54] DIRECTIONAL OPTICAL FILTER

[75] Inventor: Richard L. Cohen, Matawan, N.J.

[73] Assignee: Allied Corporation, Morristown, N.J.

[21] Appl. No.: 476,297

[22] Filed: Mar. 17, 1983

[51] Int. Cl.⁴ .................................................. G02B 5/20
[52] U.S. Cl. .................................................. 350/276 R
[58] Field of Search .................................... 350/276 R

[56] References Cited

U.S. PATENT DOCUMENTS

| 2,053,173 | 9/1936 | Astima | 350/276 |
| 2,909,770 | 10/1959 | Pugsley | 350/276 R |
| 3,784,282 | 1/1974 | Yamazaki et al. | 350/452 |

Primary Examiner—John K. Corbin
Assistant Examiner—Rebecca D. Gass
Attorney, Agent, or Firm—Stan Protigal; Howard Massung

[57] ABSTRACT

A directional filter is constructed with a plurality of grooves (15) extending into a plate (13) from one side (16) thereof. The grooves (15) have a light absorbing characteristic which causes them to absorb light impinging upon the grooves, particularly light impinging upon the grooves (15) from within the plate (13). Since all light passing beyond a certain angle $\phi$ must impinge upon the grooves (13), and only a small percentage of light passing parallel to the cut of the grooves (15) would impinge upon the grooves (15), the filter has a high ratio of attenuation of unwanted versus wanted light.

17 Claims, 3 Drawing Figures

DIRECTIONAL OPTICAL FILTER

BACKGROUND OF THE INVENTION

This invention relates to radiant energy filtration and more specifically to a directional filter which attenuates radiant energy such as light entering the filter from outside of a pre-determined angle of incidence. In particular, the invention is useful for heads down displays in aircraft cockpits, although it may also find utility in a number of other applications using video displays under adverse lighting conditions.

Heads down displays of the type described are used to display a wide variety of aircraft navigational information in the cockpit of the craft. Often, different information is superimposed or is presented in detail which is difficult to read under varying ambient light conditions. When ambient light is low, as in night flying, it is a relatively simple task to reduce the brightness of the aircraft display. On the other hand, there are frequently ambient light conditions which require a display brightness that would be impractical either as a result of the capabilities of the display or the safety or comfort of the viewer. For example, if sunlight is creating a high glare condition, the display would not only have to overcome the glare but be bright enough for the information provided by the display to be discernible over background lighting conditions. Additionally, during the aircraft's maneuvering, lighting conditions can be expected to change rapidly. While an optical sensor can be used to sense ambient light intensity conditions, glare conditions can not always be determined by merely measuring ambient light levels.

The fixed position of the pilot-viewer enables the use of filter techniques which direct light in a single direction. For this reason, directional filters of various types have been placed in front of the CRT displays in order to block light from external sources which would tend to cause glare, while passing that light from the CRT which is traveling in the direction of the viewer. While there is a certain amount of optical amplitude (brightness) loss inherent in the use of any filter, the loss of brightness is compensated for by the decrease in glare conditions.

Prior art light filtration techniques include the use of neutral density filters. Such filters attenuate external source light as well as light from the display; however, external source light necessarily passes the filter twice and, therefore, is blocked by a square of the attenuation of light from the display itself. In the case of monochromatic displays, a notch filter is sometimes used to select the specific colors of light which are generated by or used in connection with the display. Ambient light would be highly filtered because only a small percentage of the ambient light would fall within the range of the notch filter. With the use of color display techniques, the use of a notch filter is less practical since several different wave lengths must be within the admittance bands of the notch filter.

Directional filters are used to transmit light only in a desired direction. If it is anticipated that ambient light which would cause glare would emanate from a direction other than that of the anticipated direction of the viewer from the display, it is possible to filter such ambient light using directional filters. In one type of prior art directional filter, a sheet of material is etched in order to form a large number of holes. The surfaces of the material at the holes have a high absorbency in order to eliminate reflection along the holes and at the surface of the sheet. Frequently, the sheets are stacked in order to enhance the attenuation effect of the filter. This technique is frequently expensive and may have light attenuation characteristics which are excessive.

Another directional filtration technique involves the construction of a filter plate from a plurality of sheets of thin material. The thin sheets are stacked so that each sheet is parallel to an admittance direction of light. The filter plate is taken from the stack of sheets by cutting a slice across the stack. This results in the filter plate being generally orthogonal to the direction of the individual thin sheets from which it is made, with the slice direction varying from the orthogonal direction for central viewing angles which vary from normal to the surface of the filter. This technique is subject to slight optical distortion and such a filter is expensive to produce.

It is, therefore, an object of the present invention to provide a light filter which has high attenuation ratio for unwanted-verses-wanted light. It is desired that such a filter have minimal attenuation of light in a desired viewing direction and have a maximum attenuation of light passing from beyond a given angle. It is further desired that the filter be useable with full color displays, as well as for the viewing of external conditions, as in the case of heads-up displays. It is further desired that the filter maintain a high effectiveness in adverse ambient lighting conditions with a minimum of attenuation of displayed lighting under those adverse conditions. The desired filter would be useful for direct view displays having passive and active illumination characteristics, as well as heads-up displays (HUD'S) and wind screens used for external viewing by humans and electronic sensors.

SUMMARY OF THE INVENTION

In accordance with the present invention, a radiant energy filter is formed from a transparent plate having a plurality of etched grooves thereon. The grooves have a high energy absorbency characteristic, particularly for energy radiating toward the grooves from within the plate. Therefore, radiant energy entering the plate from an angle which would cause the radiant energy to impinge upon the grooves is highly attenuated, whereas radiant energy entering the plate and not impinging upon the grooves is attenuated only by the optical characteristics of the plate.

Advantages include a high attenuation-to-attenuation ratio for light entering from beyond a view range, as compared with light entering from within a view range. Further advantages include a high filtration efficiency in a wide variety of applications.

DETAILED DESCRIPTION OF THE PREFERRED EMBODIMENT

Figure 1:
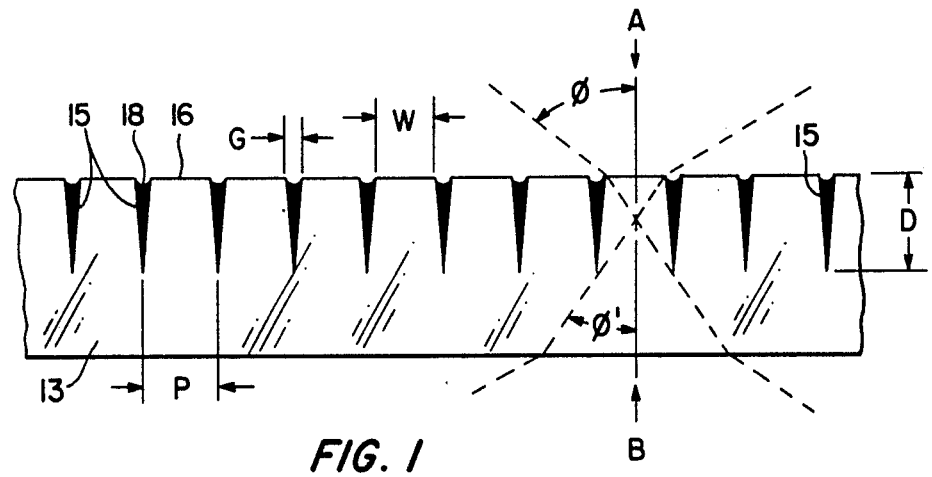
FIG. 1 is an end view of a filter plate constructed in accordance with the present invention.
Figure 2:
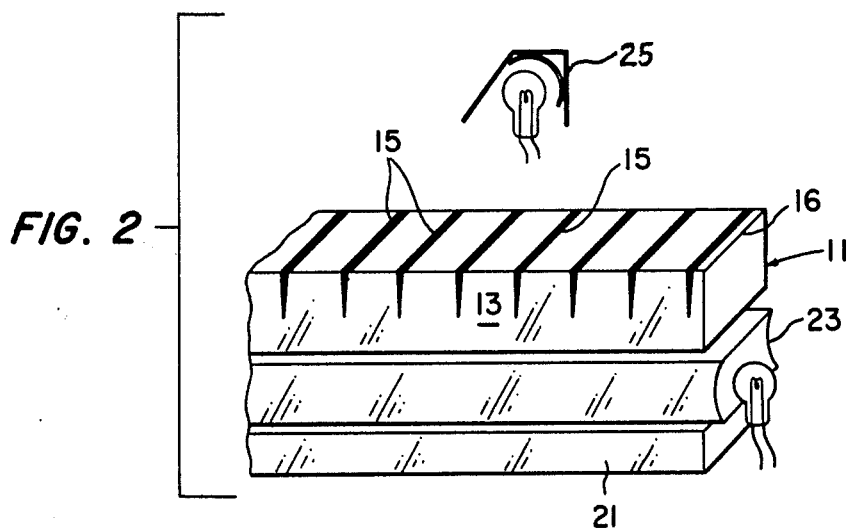
FIG. 2 is an isometric elevational view, showing the inventive filter plate used in association with a display with passive illumination.

Referring to FIG. 1, and end view of a directional optical filter 11 constructed according to the present invention as shown. The directional optical filter consists of a substantially transparent plate 13 having a plurality of grooves 15 cut into one side 16 of the plate 13. In the preferred embodiment, the grooves 15 extend in a parallel fashion across the face of the plate 13, as can be seen in FIG. 2. It is alternatively possible to arrange the grooves 15 in different patterns, such as concentric circles (not shown).

Referring again to FIG. 1, the grooves 15 have a high light absorbency characteristic for light entering the grooves 15 from within the plate 13. Preferably, the absorbency of light passing from within the plate 13 to the grooves 15 is 0.9 or greater, where 1.0 is perfect absorbency. Thus, light impinging upon the grooves 15 is not reflected back into the plate 13. The grooves 15 may be filled with light absorbing material 18 so that light impinging upon the grooves 15 from outside of the plate 13 is also absorbed at the grooves 15.

In the preferred embodiment, the grooves 15 are created by etching the plate 13 through a mask. Alternatively, the grooves 15 are formed by using a special mold for the filter plate 13. The mold (not shown) would have appropriate knife edges along a surface corresponding to side 16 of the plate 13.

The plate 13 is made of a media which is able to transmit the radiant energy to be filtered, in this case light. Typical materials include glass, epoxy and methyl methacrylate. In order to enhance filtration, the media itself may have radiant energy filtering properties. For example, the media may include a polarized light filter, a neutral density partial absorption characteristic or a slective filtration characteristic.

Referring again to FIG. 1, any light passing through the plate 13 will either hit or miss one of the grooves 15 according to the direction that the light is travelling with respect to the plate 13 and the proximity of the light's path to the grooves 15. That light impinging upon the grooves 15 is for the most part absorbed and that light not impinging upon the grooves 15 is for the most part transmitted. Beyond a certain angle $\phi$, substantially all light is absorbed. Taking into account the refraction characteristics of the plate 13 itself, this angle $\phi$ translates to an exterior angle of $\phi$. If the grooves 15 are cut normal to the surface on the side 16 of the plate 13 from which they are cut, light impinging upon the grooves from either direction normal to the plate 13, represented by arrows A and B, is transmitted in accordance with:

$$A[G/(G+W)],$$

where

A = the absorbency of the plate 13 at other than at the grooves 15;
G = the maximum width of the grooves; and
W = the distance or width between adjacent grooves 15.

This absorbency rate is maintained more or less constant for angles from the normal direction which do not exceed the angular cut from normal of the grooves 15. The absorbency of the filter 11 is reduced in a linear fashion between that angular direction and $\phi$ (or $\phi'$, according to one's point of reference). $\phi$ itself is determined by:

$$\phi' = \arctan \frac{D}{W - 2(G/2)}$$

so that $$\phi' = \arctan D/(W-G),$$

where

D = depth of the grooves 15.

$\phi$ can be obtained by adjusting $\phi'$ for the coefficient of refraction for the plate 13, in accordance with Snell's law.

As can be seen, the effects of the filter 11 are such that the viewer can be looking from either side A or B. In the preferred embodiment, the viewer will probably be observering from side A because an anti-reflection coating (not shown) will be used in such a way that the anti-reflection coating will cover the light absorbing material 18 in the grooves 15. Anti-glare coatings are well known, with the anti-glare coatings of the present invention being defined by military specification MIL-C-14806A.

Referring to FIG. 2, the optical filter 11 is shown placed over a passive display such as a liquid nematic crystal display 21. A separate slight dispersing element 23 is disposed between the display 21 and the filter 11 in order to provide illumination for the display 21 when needed. This may be necessary where the direction of illuminating light exceeds the angle $\phi$ (FIG. 1). The illuminating light would, of course, come from a preferred direction and have preferred spectral characteristics, thereby reducing induced glare in a manner known to those skilled in the art. It is also possible to use external light source 25 with the filter, provided that the absorbency characteristics of the filter 11 are taken into consideration. In practice, it is unlikely that the optical filter would be used with a purely passive display, but it is anticipated that some displays will use a combination of passive and active display elements, thereby necessitating the use of anti-glare filteration.

Figure 3:
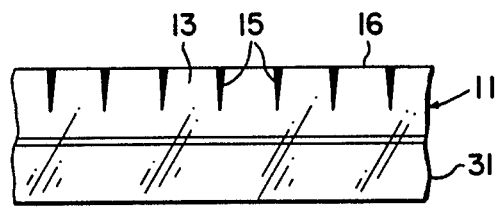
FIG. 3 is an end view showing the inventive filter plate used in association with a cathode ray tube face plate.

Referring to FIG. 3, the filter 11 is shown as placed against a conventional face plate 31 for a cathode ray tube (CRT). As is the case with the above configurations, it is possible to invert the filter 11 so that the grooves 15 face the displayed image, that is, the image transmitted through a face plate 31.

While parallel grooves, such as shown in FIG. 2, have been described, it is also possible to use other arrangements for the pattern of the grooves 15. For example, the grooves 15 can be laid out as concentric circles (not shown), thereby effectively reducing glare from a variety of directions. It is also possible to form the grooves 15 at an angle other than normal to the side 16 from which they extend (configuration not shown). This creates a central viewing direction which is at an angle other than normal to the plate 13.

In practical applications, it is anticipated that plural filters, having the grooves extending in an orthogonal direction, will be used. Referring to FIG. 3, two filters would be stacked in the same manner that filter 11 and plate 31 are shown stacked. Alternatively, it is possible to cut a second set of grooves (not shown) on the same plate 13, orthogonal to grooves 15, on the same or opposite side of the plate 13 as grooves 15.

While the filter 11 has been described in terms of visible light, the present invention is also adaptable to shorter wave length energy such as ultraviolet light and to longer wave length energy such as intrared and microwave energy.

Inasmuch as the present invention can be adapted to a wide variety of specific configurations, it is desired that the present invention can be read as limited only by the claims.

What is claimed is:

1. Filter for selectively admitting radiant energy to pass therethrough including at least one radiant energy transmitting media having first and second sides, and a surface of the media on the first side, wherein an image on one side of the media can be viewed from the other side, characterized by:

said surface being interrupted by a plurality of light-absorbing grooves, the plurality of grooves extending from said surface, extending less than completely through the media and arranged in a pattern, the grooves having a characteristic of absorbing said radiant energy impinging thereon from within the media, such that radiant energy passing said surface from a pre-determined angle from normal to said surface is substantially absorbed and radiant energy passing said surface from less than said pre-determined angle and not impinging upon the grooves is transmitted in accordance with radiant energy transmitting characteristics of said media for that energy.

2. Apparatus as described in claim 1 further characterized by the radiant energy being light.

3. Apparatus as described in claim 1 further characterized by said media being a solid material.

4. Apparatus as described in claim 1 further characterized by the media being a flat plate.

5. Apparatus as described in claim 1 further characterized by the media having a characteristic of selectively absorbing light which does not impinge upon the grooves.

6. Apparatus as described in claim 1 further characterized by th media having a characteristic of partially absorbing that light which does not impinge upon the grooves.

7. Apparatus as defined in claim 1 further characterized by an anti-glare coating, which is applied to one side of the media.

8. Apparatus as defined in claim 1 further characterized by the grooves being arranged in a pattern such that the grooves extend along said surface in a parallel direction with respect to each other.

9. Apparatus as defined in claim 8 further characterized by:

a second radiant energy transmitting media, having a second set of grooves cut therein in a parallel direction with respect to each other;

the second media being disposed adjacent to one of the sides of said one media so that the grooves in the second media are substantially orthogonal to the grooves in said one media.

10. Apparatus as described in claim 8 further characterized by a second set of grooves extending in a parallel direction with respect to each other, the second set of grooves being disposed in an orthogonal direction to the first set of grooves.

11. Apparatus as claimed in claim 1 further characterized by the grooves being arranged in a pattern such that adjacent grooves form concentric circles on said surface.

12. Apparatus as described in claim 1 further characterized by the grooves extending from said surface at an angle from normal to the surface.

13. Apparatus as described in claim 1 further characterized by the media being glass.

14. Apparatus as described in claim 1 further characterized by the media being plastic.

15. Apparatus as described in claim 14 further characterized by the media being methyl methacrylate.

16. Apparatus as described in claim 14 further characterized by the media being epoxy.

17. A video display including a cathode ray tube and a filter for selectively admitting radiant energy to pass therethrough, the filter including at least one radiant energy transmitting media having first and second sides, and a surface of the media on the first side wherein an image on one side of the media can be viewed from the other side, characterized by:

said surface being interrupted by a plurality of light-absorbing grooves which are cut into said surface so as to extend less than completely through the media, the plurality of grooves extending from said surface and arranged in a pattern, the grooves having a characteristic of absorbing said radiant energy impinging thereon from within the media, such that radiant energy passing said surface from pre-determined angle from normal to said surface is substantially absorbed and radiant energy passing said surface form less than said pre-determined angle and not impinging upon the grooves is transmitted in accordance with radiant energy transmitting characteristics of said media for that energy.

* * * * *